INVENTOR
ORVILLE J. NORDGREN
BY
Carpenter, Abbott, Coulter & Kinney
ATTORNEYS 3,154,872
TAMPER-PROOF MARKINGS FOR
REFLECTING STRUCTURES
Orville J. Nordgren, White Bear Lake, Minn., assignor to Minnesota Mining and Manufacturing Company, St. Paul, Minn., a corporation of Delaware
Filed Feb. 13, 1963, Ser. No. 258,228
3 Claims. (Cl. 40—135)

This invention relates to reflex-reflecting sheet structures characterized by the fact that they contain, within their structure, tamper-proof legend markings which are faintly visible to the naked eye of an observer under daytime diffuse-lighting conditions but become visibly indistinct to the observer when the face of the sheeting is viewed under reflex-reflecting conditions.

Many who use reflex-reflecting sheeting for official purposes such as, for example, auto licenses and the like have sought for ways to be able to identify officially authorized reflex-reflecting structures and distinguish them from counterfeit structures. Of course, a validation stamp or tax stamp applied over or directly upon the surface of a reflex-reflecting structure is one way for such identification; but the problem of counterfeit duplication of the stamp so applied is ever present.

This invention provides a way to mark authorized structures in such a manner that the marking is visible but not readily apparent to a casual observer even under daytime diffuse-lighting conditions, and becomes essentially completely indistinct even to a veteran observer under reflex-reflecting conditions. Of course, if desired, the teachings herein may be used to render a marking as taught herein quite readily visible to a casual observer when the face of the reflex-reflecting structure of this invention is viewed at close range (e.g., within about 30 feet or nearer to the face of the structure), but indistinct to the observer under reflex-reflecting conditions.

A further advantage of the structures hereof is that the reflex-reflecting character of a sign, including its intelligence indicia for motorists, may be maintained without noticeable change. Thus, utilization of the principles of the instant invention does not interfere with existing reflex-reflecting practices, but enhances the possibility of detecting any fraud, unauthorized duplication of a sign, or tax evasion and the like.

It is critical, however, that the portion of a reflex-reflecting structure in which the teachings hereof are employed must be formed with a continuous back reflector. This does not mean, however, that an entire reflex-reflecting structure must have a continuous back reflector in order for the teachings hereof to be used as a part thereof.

Figure 1:
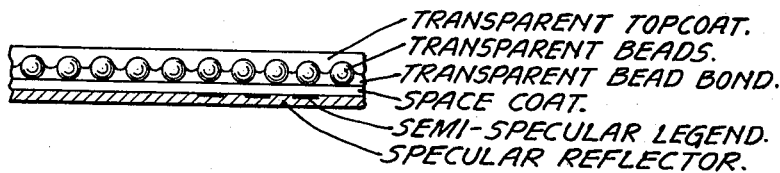
Figure 2:
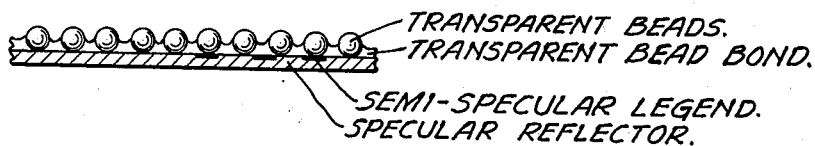

The drawing made a part hereof illustrates two highly preferred embodiments of my invention in cross section. FIGURE 1 may be noted to be quite analogous to, for example, FIGURES 1, 2 and 3 of Palmquist et al. U.S. Patent No. 2,407,680, except that the back reflector for my structure is made up of a semi-specular legend and a highly specular background for that legend. FIGURE 2 of my drawing is quite analogous to, for example, FIGURE 2 of Gebhard et al. U.S. Patent No. 2,326,634, except that the back reflector for my structure again consists of a highly specular field surrounding semi-specular legend markings. For the sake of brevity, the teachings of both the Palmquist et al. Patent No. 2,407,680 and the Gebhard et al. Patent No. 2,326,634, insofar as the same are directed to reflex-reflecting structures having a continuous or flat-surfaced back reflector and transparent material over that reflector, are here incorporated by reference.

As illustrated in my drawing, the critical distinction between the prior art and structures wherein my teaching is employed lies in the continuous back reflector portion. The major portion of my continuous back reflector is highly specular. It contains semi-specular legend markings. These legend markings must be extraordinarily thin in width. They should not be greater than about $\frac{1}{64}$ inch in width and may be as thin as $\frac{1}{128}$ of an inch or even $\frac{1}{256}$ of an inch. They are most conveniently formed by printing either directly upon the rear continuous or substantially flat transparent surface underlying a monolayer of microspheres and binder (or underlying a space coat) or directly upon a highly specular continuous back reflector; and the method chosen will vary depending upon whether the composite reflex-reflecting structure is formed by building it up from the back reflector or by building it in reverse fashion starting with the external or exposed front face or surface layer of the structure. Direct build-up from a back reflector as well as the reverse method of forming reflex-reflecting structures is now well known, see the disclosure in the aforementioned Palmquist et al. and Gebhard et al. patents. However, the expense of forming a reflex-reflecting structure by such methods and incorporating in it the improvements taught herein are not likely to be accomplished by the average fleeting counterfeiter. Thus protection against fraud and counterfeiting is considerably enhanced by the practice of my invention.

The legend markings for my structures are formed of semi-specular-reflecting material; and in this respect, the total intensity of specular-reflection of the legend markings in the visible spectrum of light is maintained on the order of 40 to 90%, preferably about 60 to 90%, of the total intensity of specular reflection in the visible spectrum exhibited by the highly specular portion of the back reflector surrounding the legend markings. For the most part, the highly specular back reflector is formed by a continuous or substantially continuous layer of metal (e.g., aluminum, copper, silver, etc.), either a metal foil which is suitably polished so as to be specular in reflection, or a vapor-deposited film of metal. In either case, the surface presented by my back reflector is highly specular except for that portion containing the legend markings. The legend markings themselves exhibit the lower intensity of specular reflection simply because they are formed of material, preferably pigment particles, which tend to diffuse light striking them to a small extent but at least to an extent greater than any diffusion which might possibly occur as light strikes the portion of my back reflector which is characterized as specular reflecting. In essence, therefore, the requirement of specularity for the major portion of my back reflector is simply to be understood as a requirement that the major portion must exhibit greater specularity than the specularity of reflection exhibited by my legend markings.

Metallic pigment is very useful to employ in making the semi-specular legend; and while it is convenient and usually preferred to employ pigments of the same metal as in the specular portion of the coating, such is not always critical. Indeed, sometimes pigments of a different metal may give desired daytime distinctions which are obliterated under reflex-reflecting conditions. Particles of such pigment may vary in size from approximately a micron, or possibly one-half micron or even smaller, up to approximately 40 microns or even slightly larger. Generally the pigment particles will be such that they are capable of passing through a screen of about 325 mesh; however, any one range of pigment size as such is not particularly critical so long as the size of pigment particles selected for a specific structure is distinct from the size of pigment particles, if any, in the specular-reflecting portion of my continuous back reflector. This observation is made because vapor-deposited metal coatings, for example are sometimes looked upon as consisting of a plurality of minute particles of metal compacted together so as to present an essentially smooth surface film which nevertheless consists of a plurality of minute particles. Specular reflection is exhibited by such films simply because the particles of vapor-deposited metal are so very tiny and so highly compacted together that the exposed surface presented is such as to behave as a uniform solid film of metal. It may be possible that slightly larger particles than those deposited by vapor deposition may be employed for the specular reflector, provided the particles selected for use in forming the legend markings are even larger.

It should also be noted that the legend markings hereof need not be formed of metallic semi-specular-reflecting pigment. Excellent results have been obtained using pearlescent pigment which is sometimes characterized as being translucent or partially transparent. Pearlescent pigments have been found to exhibit semi-specular reflectance in the structures hereof. It is further possible that differences in specular reflectivity may be built into my structures by relying upon a slight masking of the reflectance of an underlying specular coating in limited legend areas.

The pigment for the legend markings may be dispersed in a binder vehicle such as an alkyd varnish, a nitrocellulose lacquer, or other transparent or substantially transparent binder vehicle.

As will be appreciated from the disclosures in the patents here incorporated by reference, various transparent microspheres or small glass beads may be employed in forming reflex-reflecting structures.

Generally for the practice of this invention the beads should have a refractive index of at least about 1.6 and preferably at least 1.7 for higher brilliance of reflection, particularly where a lenticular surface structure is employed as taught in the patent of Gebhard et al. Useful results for lenticular surfaced structures, however, are possible where beads exhibiting refractive indices as low as about 1.6 or 1.65 and as high as approximately 2.0, or even 2.5 are used. The usefulness of the higher refractive index beads in lenticular structures becomes particularly apparent when such structures are covered by a film of water. Such a film will tend to "black out" lenticular structures employing beads of 1.9 refractive index, but not those employing beads of 2.5 refractive index. Of course, the most striking reflex-reflecting results for lenticular structures not covered by a film of water are gained when spheres of refractive index between about 1.7 and 1.9 are employed.

In some structures, particularly those having a flat front face as illustrated in FIGURE 1, beads exhibiting refractive indices as high as about 2.9 may be employed for best results. In flat surfaced structures, as particularly disclosed in the Palmquist et al. patent here incorporated by reference, the specific refractive index for the beads selected for use should be at least 1.15 times that of the refractive index of the transparent top covering selected for the structure. In addition a spacing coating is selected so as to increase the reflex-reflection brilliancy of the entire structure as compared to an otherwise identical structure lacking such spacing coat.

While the diameter of the transparent beads may vary greatly as taught in the prior art, it is generally preferred to employ beads having a diameter of at least about 10 microns and no more than approximately 150 microns. However, transparent beads or spheres as large as about 250 microns or larger may be useful in specialized applications.

The patents incorporated by reference also fully illustrate various types of transparent bead bond binder materials satisfactory to employ as well as various transparent covering films or top coats and spacing films.

As a further illustration of reflex-reflecting structures of the invention, the following specific example is offered. This example will be formed by the reverse method, starting with the exposed front layer first. It is similar to Example 3 of Palmquist et al. Patent No. 2,407,680, with the exception that my composite back reflector (semi-specular legend and specular reflector) is interposed between the space coat and adhesive coat of the structure described in Example 3 of said Palmquist et al. patent.

Specifically, a low adhesion carrier web (such as particularly described in Example 1 of said Palmquist et al. patent) is roll coated with N-butyl-methacrylate polymer resin dissolved in xylol (45% resin solids) to provide a coating weight between about 13–15 grains of resin solids per 24 square inches. The coating is dried for 20–20 minutes at 140° F. followed by additional drying for 30–40 minutes at 180–200° F. Its refractive index is approximately 1.48.

Next the integral transparent binder coating for the beads is formed by roll coating the transparent covering surface with 6–9 grains per 24 square inches of the following resin solution:

Parts by weight
N-butyl-methacrylate polymer resin _____ 45
Methylacrylate-isobutylacrylate solution polymer (described as the laminating adhesive solution in Example 2 of Palmquist et al. Patent No. 2,407,680) ___ 33
Xylol (volatile solvent) _____ 55

Transparent glass beads of about 2.1 refractive index are then applied over the bead binder coating and allowed to sink therein. Solvent from the bead binder coating is removed by a drying period of 20–25 minutes at 140° F. and 30–40 minutes at 180–200° F. Beads of approximately 3.6 to 4.2 mils diameter are used.

The integral transparent spacing film is next formed by roll coating the beaded surface with the same resin solution as the transparent binder coating for the beads. A solution coating weighing 15–18 grains per 24 square inches is used, followed by a drying period of 20–30 minutes at 140° F. and 60–90 minutes at 200–220° F.

Next semi-specular legend markings, e.g., the word "legend," in broken lines of about 1/64 inch width is reverse printed upon the exposed surface of the space coat using an aluminum pigment, the particles of which are such that 98% pass through a 400 mesh screen but are larger than about one micron in size. Excellent results have been obtained using semi-leafing pigment; and for illustrative purposes a semi-leafing pigment is used having coverage on water of 25,000 square centimeters per gram. For printing, the pigment is dispersed at a concentration of about 30 parts by weight in 100 parts by weight of a nitrocellulose lacquer (about 15% solids dissolved in a mixture of solvents including ethyl acetate, ethyl alcohol and methanol).

Thereafter the solvents from the inked indicia are allowed to evaporate under room temperature conditions. Then aluminum (in the form of vapor particles of minute or molecular size at least smaller than a micron) is vapor-deposited over the entire exposed surface of the structure at a film thickness of 200 angstrom units, using conventional vapor deposition techniques. (Of course, thicker films or even thinner films may be used so long as the film is opaque and specularly reflects light.)

A protective resin coating such as the binder coating for the beads may now optionally be applied to protect the vapor-deposited aluminum from abrasion. Also, or alternatively, an adhesive may be applied over the vapor-deposited film; and while conventional solvent coating of adhesive such as, for example, illustrated in the aforenoted Palmquist et al. patent may be used, it is very satisfactory to laminate a solvent-free adhesive film upon the rear surface of the structure so as to thereby avoid the possibility of disrupting the high specularity of the vapor-deposited film by solvent. A suitable adhesive structure for lamination to the rear of the vapor-deposited film is one consisting of a low adhesion liner of polyethylene-coated paper carrying a thin rubber-resin-type pressure-sensitive adhesive such as methylacrylate isobutylacrylate. After lamination of adhesive to the exposed surface of the vapor-deposited aluminum, the low adhesion liner may be stripped away from the adhesive surface and the low adhesion carrier stripped from the top surface of the structure to leave one with a composite reflex-reflecting structure which may be adhesively secured to a substrate to provide reflex-reflection. Because of the flat top coat on this structure, it is effective to reflex-reflect light under both wet and dry conditions.

Semi-specular reflecting legend markings formed of the aluminum pigment illustrated in this example have been found to exhibit a specular reflection of approximately 88% that of vapor-deposited aluminum films. When a structure such as illustrated is viewed at close range under daylight diffuse-lighting conditions or random incident lighting conditions, the legend markings are detectable, but under reflex-reflecting conditions they are obliterated. It appears that the reflectivity of the legend markings, although less than the reflectivity of the surrounding field of the back reflector, acts in combination with the higher reflectivity of the surrounding field and the narrowness of the legend lines to obliterate the legend under reflex-reflecting conditions. Thus, by the simple expedient of comparing the appearance of the sheeting under daytime lighting conditions and under the lighting of a flashlight held close to an observer's eye (which provides a method of viewing under reflex-reflecting conditions), sheeting of the invention may readily be distinguished from that provided with surface markings or other comparable non-authorized markings.

That which is claimed is:

1. In a reflex-reflecting sheet structure having, at least in one portion thereof, a continuous back reflector and a compact monolayer of transparent beads thereover and transparently bonded in optical connection therewith, the improvement characterized by the feature that said continuous back reflector is a specular-reflecting metallic reflector provided with semi-specular pigmented legend markings no greater than about $1/64$ inch in width on a minor portion thereof, said markings being such that they exhibit a total intensity of specular reflection in the visible spectrum on the order of 40–90% the total intensity of specular reflection in the visible spectrum exhibited by said highly specular metallic reflector, whereby said legend markings are visible to the naked eye of an observer viewing the front face of said reflex-reflecting structure under daytime diffuse-lighting conditions, but become visibly indistinct to the observer when the face of the structure is viewed under reflex-reflecting conditions.

2. In a reflex-reflecting sheet structure having, at least in one portion thereof, a transparently bonded monolayer of small transparent beads no larger than 10 mils in diameter, and an internal light-reflecting layer underlying said beads and positioned in optical relationship with the back extremities thereof so as to produce reflex-reflection, the improvement characterized by the feature that the internal light-reflecting layer includes printed areas formed of particles of semi-specular reflecting material and non-printed areas formed of specular-reflecting material, the pattern of said printed areas being such that the width of any portion thereof does not exceed about $1/64$ inch, and said printed areas further being such that they exhibit a total intensity of specular reflection in the visible spectrum on the order of 40–90% the total intensity of specular reflection in the visible spectrum exhibited by said non-printed areas, whereby said printed areas are visible to the naked eye of an observer viewing the front face of said reflex-reflecting structure under daytime diffuse-lighting conditions but become visibly indistinct to the observer when the face of said structure is viewed under reflex-reflecting conditions.

3. In a reflex-reflecting sheet structure having, at least in one portion thereof, a continuous back reflector, a transparent spacing layer overlying said continuous back reflector, a light-returning compact monolayer of small transparent spheres whose back extremities substantially contact said spacing layer and are in optical connection with said back reflector, the spacing distance provided by said spacing layer being such as to substantially increase reflex-reflection brilliancy of said sheet structure as compared wth no spacing, transparent binder material between said spheres, and a continuous overlying transparent solid covering united and conforming to the front extremities of said spheres and having a flat front face, said spheres having a refractive index at least 1.15 times that of said transparent covering, the improvement characterized by the feature that said back reflector consists essentially of semi-specular-reflecting legend markings no greater than about $1/64$ inch in width and a specular-reflecting metallic reflector as the surrounding field about said legend markings, said legend markings being formed of semi-specular pigment particles such that said legend markings exhibit a total intensity of specular reflection in the visible spectrum on the order of 40–90% the total intensity of specular reflection in the visible spectrum exhibited by said metallic reflector, whereby said legend markings are visible to the naked eye of an observer viewing the front face of said reflex-reflecting structure under daytime diffuse-lighting conditions, but become visibly indistinct to the observer when the face of said structure is viewed under reflex-reflecting conditions.

References Cited in the file of this patent

UNITED STATES PATENTS

| | | |
|---|---|---|
| 1,860,719 | Miller | May 31, 1932 |
| 2,326,634 | Gebhard | Aug. 10, 1943 |
| 2,407,680 | Palmquist | Sept. 17, 1946 |
| 2,531,945 | Moulton | Nov. 28, 1950 |
| 2,882,632 | Rockwell | Apr. 21, 1959 |
| 2,951,419 | Lemelson | Sept. 6, 1960 |